(12) United States Patent
Sievert et al.

(10) Patent No.: US 6,832,376 B1
(45) Date of Patent: Dec. 14, 2004

(54) METHOD AND APPARATUS FOR RESUSE OF A THREAD FOR DIFFERENT PROGRAMMED OPERATIONS

(75) Inventors: James A. Sievert, Lino Lakes, MN (US); Mark K. Vallevand, Lino Lakes, MN (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/409,008

(22) Filed: Sep. 29, 1999

(51) Int. Cl.[7] ................................................ G06F 9/46
(52) U.S. Cl. ...................................... 718/102; 718/103
(58) Field of Search ............................... 718/100–108; 719/315, 316, 310

(56) References Cited

U.S. PATENT DOCUMENTS

| | | | | |
|---|---|---|---|---|
| 5,504,894 A | * | 4/1996 | Ferguson et al. | 707/2 |
| 5,542,088 A | * | 7/1996 | Jennings et al. | 718/103 |
| 5,835,763 A | * | 11/1998 | Klein | 718/101 |
| 6,085,217 A | * | 7/2000 | Ault et al. | 718/105 |
| 6,112,196 A | * | 8/2000 | Zimowski et al. | 707/2 |
| 6,175,916 B1 | * | 1/2001 | Ginsberg et al. | 712/228 |
| 6,189,023 B1 | * | 2/2001 | Emlich et al. | 718/100 |
| 6,240,440 B1 | * | 5/2001 | Kutcher | 718/102 |
| 6,418,458 B1 | * | 7/2002 | Maresco | 718/103 |
| 6,499,047 B2 | * | 12/2002 | Kikuchi et al. | 718/100 |
| 6,687,729 B1 | * | 2/2004 | Sievert et al. | 718/102 |
| 2003/0163600 A1 | * | 8/2003 | Lankinen et al. | 709/318 |
| 2003/0200253 A1 | * | 10/2003 | Cheung et al. | 709/107 |

OTHER PUBLICATIONS

Booch, Grady. "Object–Oriented Design with Applications". The Benjamin/Cummings Publishing Company, Inc. 1991. pp. 54–57.*
Microsoft Corporation. "DirectShow C++ Class Library." 1997.*
Rao, Bindu R. "C++ and the OOP Paradigm." Chapter 5, Polymorphism. 1993.*
Rogue Wave Software. Chapter 11, "The priority queue Data Abstraction.". 1996.*
IBM Corporation. "IThread" and "IThreadFn". 1998.*
Wang, Jing. "Thread Optimizations in Concurrent Object Oriented Languages." Sep. 1998.*
IBM Corporation. "Starting a Thread." 1998.*
Bass, Phil. "Supporting Threads in Standard C++ Part 1". The Association of C & C++ Users, 2000.*

* cited by examiner

Primary Examiner—Lewis A. Bullock, Jr.
(74) Attorney, Agent, or Firm—Charles A. Johnson; Mark T. Starr; Crawford Maunu PLLC

(57) ABSTRACT

A method and apparatus for reusing a thread for different programmed operations are provided in various embodiments. In one embodiment, different application operations are defined as subclasses of a thread operation class, and a thread is implemented with a thread class. In one embodiment, the application operations can be queued to the thread for scheduled execution using the thread. In another embodiment, a first application operation can start a thread and be executed therewith, while a second application operation can attach to the thread for execution.

12 Claims, 9 Drawing Sheets

METHOD AND APPARATUS FOR RESUSE OF A THREAD FOR DIFFERENT PROGRAMMED OPERATIONS

FIELD OF THE INVENTION

The present invention generally relates to threads of computer program execution, and more particularly, to use and reuse of a thread for different programmed operations.

BACKGROUND OF THE INVENTION

A thread is commonly viewed as a light-weight flow of control within a process, wherein a process is a heavy-weight flow of control. A process is heavy-weight in that the operating system allocates a dedicated memory domain for program code and data used by the process, whereas a thread is lightweight in that a thread exists within the memory domain of a process. Some processes are multithreaded such that multiple threads can execute concurrently within a process.

Threads are generally created with support from an operating system and are commonly executed by coupling the thread with a specific operation. That is, a thread is created for the purpose of performing a specific operation. After the operation is complete, the thread may be destroyed or reused in performing the same operation with perhaps different input data.

Creating and initiating new threads can be expensive in terms of consuming operating system resources. Each time a new thread is required, control must be passed to the operating system in order to create the thread, and establish and create any structures required to manage the thread. Thus, some applications create multiple threads for performing the same operation within a process. However, the threads are dedicated to the specific operations for which they were created, which may be inefficient for resource utilization. For example, a first set of threads may be created and dedicated to a first function of a system, and a second set of threads may be created and dedicated to a second function of the system. If demand for the first function is low, wherein only a few of the first set of threads are called upon, and demand for the second function is high, wherein there exists more demand for the second function than there are available threads, then the system's performance may be constrained by the limited number of threads available for performing the second function. In other words, demands for work performed by the second function may be delayed because of the limited number of threads associated with the second function.

The foregoing scenario illustrates a situation where performance may be degraded even though there may be processing capacity available to meet the demand. Specifically, threads associated with the first function are idle while threads associated with the second function are fully utilized.

A method an apparatus that addresses the aforementioned problems, as well as other related problems, is therefore desirable.

SUMMARY OF THE INVENTION

In various embodiments, the invention provides reuse of a thread for executing application operations of different types. A thread operation class is defined as an abstract class from which concrete application operations can be instantiated. The application operation instances implement different functions for example. A separate thread is instantiated from a thread class. The various application operations can be scheduled for execution using the thread either by queuing the operations against the thread with the operating system or by starting the thread with one of the application operations and using an attach method to associate the other application operations with the thread.

In accordance with another embodiment of the invention, there is provided a computer program product that is configured to be operable to provide reuse of a thread for executing application operations of different types.

The above summary of the present invention is not intended to describe each disclosed embodiment of the present invention. The figures and detailed description that follow provide additional example embodiments and aspects of the present invention.

BRIEF DESCRIPTION OF THE DRAWINGS

Other aspects and advantages of the invention will become apparent upon review of the Detailed Description and upon reference to the drawings in which.

Figure 1:
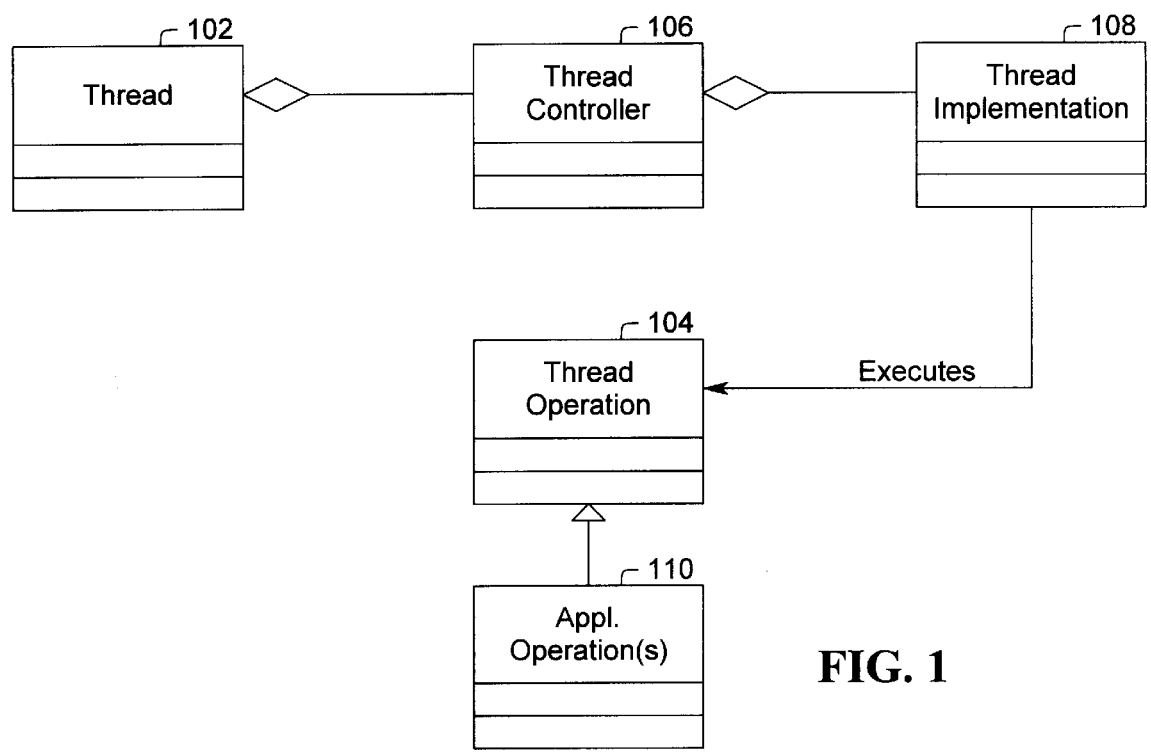
FIG. 1 is a class diagram for implementing threads and thread operations in accordance with one embodiment of the invention.

While the invention is susceptible to various modifications and alternative forms, specific embodiments thereof have been shown by way of example in the drawings and will herein be described in detail. It should be understood, however, that the detailed description is not intended to limit the invention to the particular forms disclosed. On the contrary, the intention is to cover all modifications, equivalents, and alternatives falling within the spirit and scope of the invention as defined by the appended claims.

DETAILED DESCRIPTION

The present invention is believed to be applicable to a variety of object oriented applications. The invention has been found to be particularly applicable and beneficial for applications written in C++ and deployed on the Windows NT operating system. While the present invention is not so limited, an appreciation of the present invention is presented by way of a specific embodiment implemented as C++ class libraries.

In various embodiments, the present invention permits threads to be multi-functional, that is, generic methods for executing discrete sets of instructions. By creating threads separate from thread operations, the threads do not need to be single-purpose. An individual, generic thread can be directed to execute a certain thread operation and then returned to an idle state. In various embodiments, the present invention provides, among other features, a consistent way to manage threads. For example, any thread operation can be assigned to any available thread. Thus, a thread can be reused for different thread operations.

FIG. 1 is a class diagram for implementing threads and thread operations in accordance with an example embodiment of the invention. The figure uses conventional Object Modeling Technique (OMT) notation to denote the classes and class relationships.

The classes are implemented in C++ in an example embodiment, and the main classes in the class diagram are thread class 102 and thread operation class 104. Thread controller class 106 and thread implementation class 108 hide various thread management and implementation details from thread class 102 and thread operation class 104, and thereby from the user.

To use the invention in this example embodiment, a programmer need only understand thread class 102 and thread operation class 104. Thread operation class 104 is an abstract class from which the application programmer derives application operation class 110 to implement a concrete class.

Application operation class 110 is a subclass of thread operation class 104. An object of thread controller class 106 references a thread object, and an object of thread implementation class references a thread controller.

An object of thread controller class 106 is generally responsible for synchronizing various functions associated with operating a thread. The attributes of thread controller class 106 indicate the state of the thread, and the member methods are used to control the synchronization.

An object of thread implementation class 108 is the object that actually interacts with the underlying operating system to create and control a thread. The thread implementation object also executes an object of application operation class 110 (which is-a-kind-of thread operation).

Figure 2:
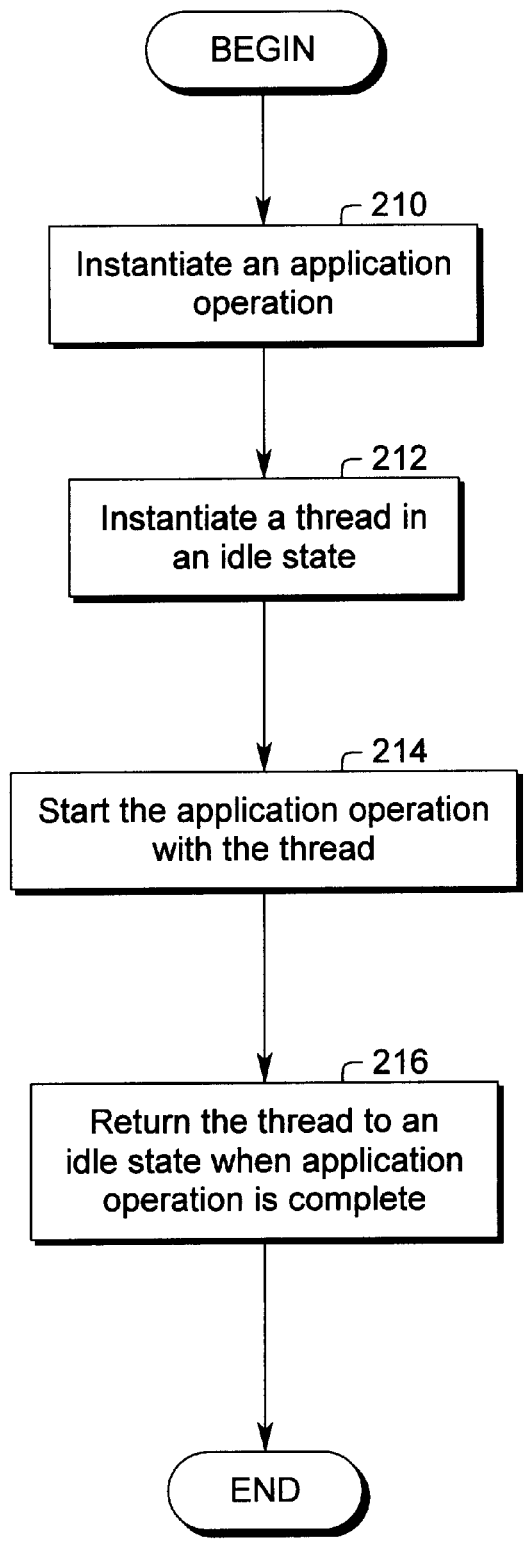
FIG. 2 is a flowchart illustrating a method for reusing a thread for different operations.

FIG. 2 is a flowchart illustrating a method for reusing a thread for different operations in accordance with an example embodiment of the invention. Generally, the method comprises defining an application operation and then instantiating separate thread and application operation objects. An application operation is a realization of the abstract thread operation class. The thread is then started and the operation executed.

Thread operation class 104 is an abstract class, and application operation class 110 is a realization of thread operation class 104.

At step 210, an application operation is instantiated, and at step 212, a thread is instantiated in an idle state. The application operation is executed at step 214 by, for example, an object of thread implementation class 108. Once the application operation is complete, the thread is returned to an idle state at step 216. The idle thread is then available to perform another application operation.

Figure 3A:
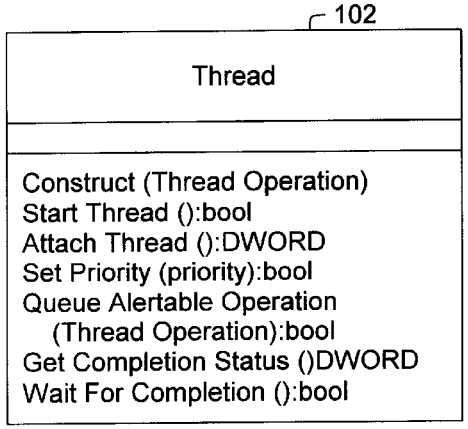
FIG. 3A shows example attributes and member methods of a thread class.

FIG. 3A shows example attributes and member methods of thread class 102. The Start Thread operation is the interface by which a thread is created with the underlying operating system. An object of application operation class 110 that inherits attributes of thread operation class 104 must be instantiated, and either the Start Thread ( ) or Attach Thread ( ) method must be used to initiate a thread for the thread operation. Note that the constructor for Thread class 102 takes as a parameter a Thread Operation object. Alternatively, the Thread Operation object could be passed as a parameter to the Attach Thread method. The Attach Thread method is the interface by which a client attaches an existing operating system thread to an object of application operation class 110.

The Attach Thread method is used when a thread is created outside the thread class. The Attach Thread method can be used to manage an externally created thread within the thread controller and thread implementation classes. It will be appreciated that the Start Thread and Attach Thread methods are not used for the same thread because the Start Thread method creates a thread and the Attach Thread method is used for a thread that has already been created.

The Set Priority method is the interface by which a client provides an operating-system relative execution priority to the thread.

The Queue Alertable Operation method is the interface by which a client queues an alertable operation to a thread that has already been created. The Windows NT operating system provides the capability for threads to be in an alterable state. The Queue Alertable Operation method passes the request to the Queue Alertable Operation method of thread controller class 106, which tests whether the thread is in a state that is compatible with accepting a queued operation. For example, if the thread is completed or stopping, the thread cannot execute another operation. When the Queue Alertable Operation method of the thread implementation class is executed, an alterataable operation count is incremented. Thus, before a thread finishes, all the alertable operations queued to it must be performed. The Get Completion Status method is used to obtain the status of a thread once the thread completes the application operation. A completion status is specific to a given application operation class. This status is returned upon the completion of the thread operation. Example completion status values include: OK, Out_Of_Memory, etc.

The Wait for Completion method is used by a client to call through to Thread Controller class 106 to wait for a thread to complete. For example, a call to Wait For Completion by a second thread while a first thread is executing causes the second thread to wait for completion of execution by the first thread before the second thread begins executing.

Figure 3B:
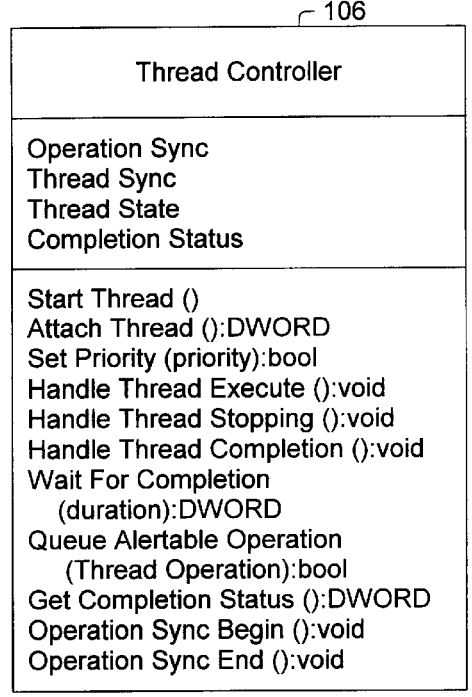
FIG. 3B shows example attributes and methods of a thread controller class.

FIG. 3B shows example attributes and methods of thread controller class 106. Thread controller class 106 is generally responsible for synchronizing various functions associated with operating a thread. The attributes of thread controller class include Operation Sync, Thread Sync, Thread State, and Completion Status.

Operation Sync is used when queuing alertable operations. For example, if there are multiple alertable operations being queued to a thread at the same time, the Operation Sync attribute is used to protect critical sections of code within Queue Alertable Operation.

Thread Sync is used by the Wait For Completion method of thread controller class 106. When set, Thread Sync indicates that the thread is in the IDLE state.

Thread State is one of IDLE, EXECUTING, or STOPPING. The IDLE state indicates that no operating system thread has been created or attached to the thread and is used by the thread object 106 for the purpose of determining whether or not startThread( ) or attachThread( ) can be executed. The EXECUTING state indicates that an operating system thread is presently executing a thread operation and is used by the thread object 106 for the purpose of whether or not alertable operations may be queue to the thread. The STOPPING state indicates the thread is in the process of halting. All alertable operations that may have been queued are drained. During this period, the thread object 106 may not queue any further alertable operations. The Completion Status attribute is used to indicate a status after completion of the thread operation. A completion status is specific to a given application operation class. This status is returned upon the completion of the thread operation. Example completion status values include: OK, Out_Of_Memory, etc.

The Start Thread method of thread controller class 106 checks whether the thread is in a state in which an operating system thread can be created. For example, another operating system thread cannot be created until the prior operating system thread has completed.

The Attach Thread method of thread controller class 106 is called from the Attach Thread method of thread class 102 and checks whether the thread is in a state in which an operating system thread can be attached. If an operating system thread can be attached, control is forwarded to the attachThread( ) method in thread implementation 108.

The Set Priority method is called from Set Priority method of thread class 102 and checks whether the thread is in a state in which a Set Priority method can be performed. If so, control is forwarded to the setpriority( ) method in thread implementation 108.

The Handle Thread Execute method is called from Announce Thread Execute of thread implementation class 108 and sets the thread state to executing and the completion state to still-active. Thread Sync is used to provide indivisibility during the state change.

The Handle Thread Stopping method is called from Announce Thread Stopping of thread implementation class 108 and sets the thread state to stopping. Thread Sync is used to provide indivisibility during the state change.

The Handle Thread Completion method is called from Announce Thread Execute of thread implementation class 108 and sets the thread state to stopped and the completion state to the parameter passed from the caller. Thread Sync is used to provide indivisibility during the state change.

The Wait for Completion method is called from Wait For Completion method of thread class 102. Wait For Completion holds the callers thread until the specified duration is reached or until the Thread State becomes IDLE.

The Queue Alertable Operation method is called from the Queue Alertable Operation method of thread class 102 and calls Queue Alertable Operation in class 108.

The Get Completion Status method is called from the Get Completion Status method of class 102 and from the Wait For Completion method of class 106 and returns the Completion Status from the class.

The Operation Sync Begin method is called to begin indivisible access to attributes within the class. It uses the Operation Sync member attribute to perform the indivisibility behavior.

The Operation Sync End method is called to end indivisible access to attributes within the class. It uses the Operation Sync member attribute to perform the indivisibility behavior.

Figure 3C:
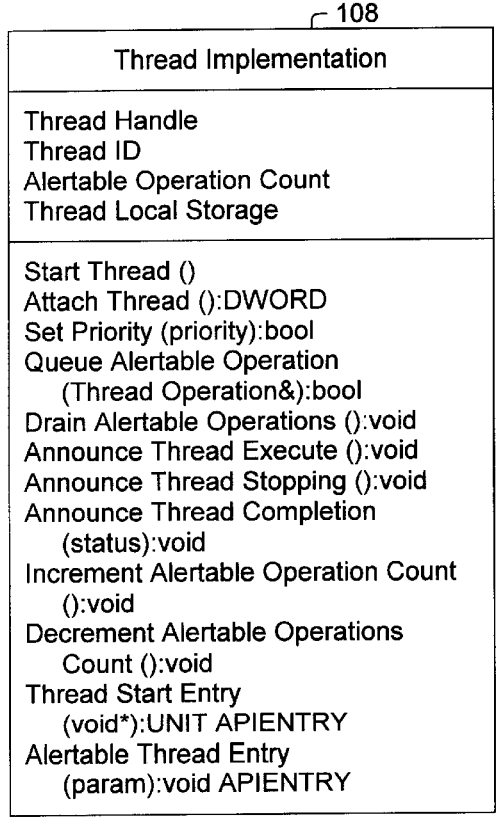
FIG. 3C shows example attributes and methods of a thread implementation class.

FIG. 3C shows example attributes and methods of thread implementation class 108. Thread implementation class 108 is the class that actually instantiates a thread object.

The Start Thread method of thread implementation class 108 interfaces with the underlying operating system to create a thread. For example, the Windows NT operating system from Microsoft provides this capability. Control is then returned to the Start Thread method of thread controller class 106, which waits for initialization by the Thread Start Entry method. Once initialized, the Operation Main method in thread operation class 104 is executed by the thread.

Thread Implementation class 108 also includes a Drain Alertable Operation method, Announce Thread Execute method, Announce Thread Stopping method, and Announce Thread Complete method. The Drain Alertable Operation method is called from Thread Start Entry and Attach Thread when the thread is stopping and forces the thread into an alertable state so that any queued thread operations are allowed to complete. The Announce methods are used to update the Thread State attribute of the Thread Controller.

Thread Implementation class 108 also includes the Increment Alertable Operation Count method and Decrement Alertable Operation Count method, which are used to adjust the count of the number of thread operations queued to the thread.

The Thread Start Entry method is the application programming interface entry point for starting a thread.

When queuing an alertable operation, the starting point for the thread (in terms of the thread operation) and the data to be input to the thread operation are provided as input to the operating system. Thus, the Alertable Thread Entry method is used to provide the parameters to the operating system and is the point at which the operating system begins execution of the thread. Note that Thread Implementation class 108 executes the Thread Operation class.

By separating the thread operation from the thread, a single thread can be used for different operations. For example, the thread class includes a Queue Alertable Operation member that can queue an operation to a thread that has already been created. The NT operating system provides the capability for threads to be in alterable states. The Queue Alertable Operation method passes the request to the Queue Alertable Operation method of thread controller class 106, which tests whether the thread is in a state that is compatible with accepting a queued operation. For example, if the thread is completed or stopping, the thread cannot execute another operation. When the Queue Alertable Operation method of the thread implementation class 108 is executed, an alertable operation count is incremented. Before a thread finishes, all the alertable operations queued to it must be performed.

It will be appreciated that during the lifetime of a thread, there are various states in which the thread may place itself to allow alertable operations to be queued for it. Alertable operations can only be queued while the thread is in the EXECUTING state.

In addition, once placed in an alertable state, the thread will execute operations queued to it.

Figure 3D:
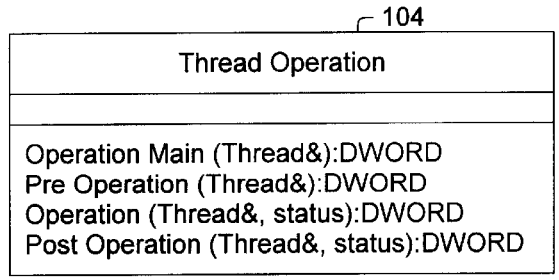
FIG. 3D shows example attributes and methods of a thread operation class.

FIG. 3D shows example attributes and methods of thread operation class 104. The Operation Main method has three methods that can be used to couple the functionality of objects of thread class 102 to user selected methods. The three member methods include: Pre Operation, Operation, and Post Operation. Pre Operation is used, for example, to notify other methods that the thread operation is about to begin. The Operation member is programmed by the user to perform a selected application operation. Post Operation is used to notify other methods that the thread operation is complete.

Figure 4:
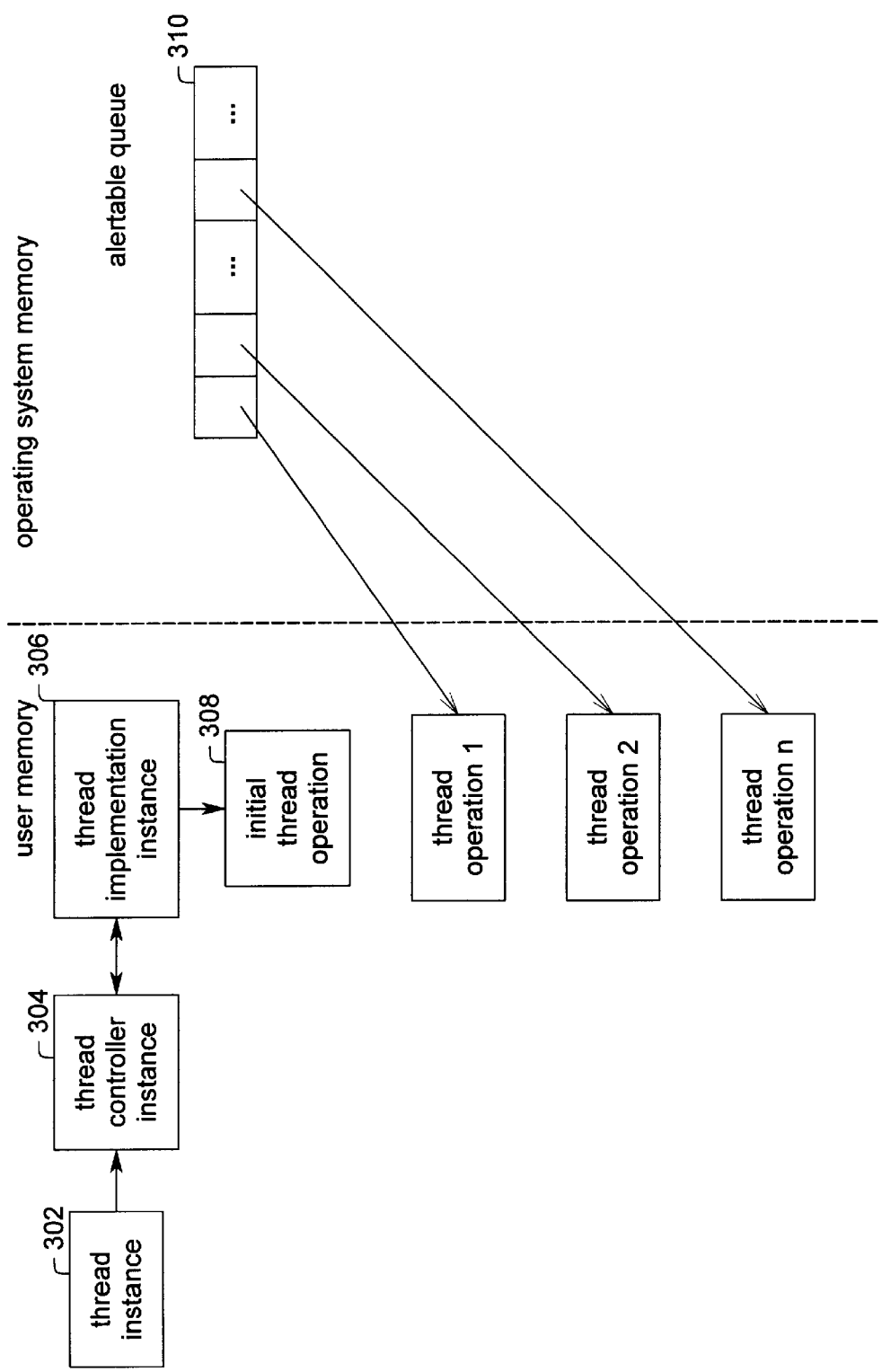
FIG. 4 is an instance model diagram that illustrates instances of objects in user memory and operating system memory.

FIG. 4 is an instance model diagram that illustrates instances of objects in user memory and operating system memory in accordance with an example embodiment of the invention. A thread instance 302, thread controller instance 304, and a thread implementation instance 306 exist in the user's memory. Thread instance 302 is executing initial operation 308 with control being passed through thread controller and thread implementation instances 304 and 306.

In the operating system memory, alertable queue 310 references additional thread operations 1-n that have been queued to thread instance 302. Thus, when initial thread operation 308 completes, the operating system selects a thread operation from alertable queue 310 for execution by thread instance 302.

Figure 5:
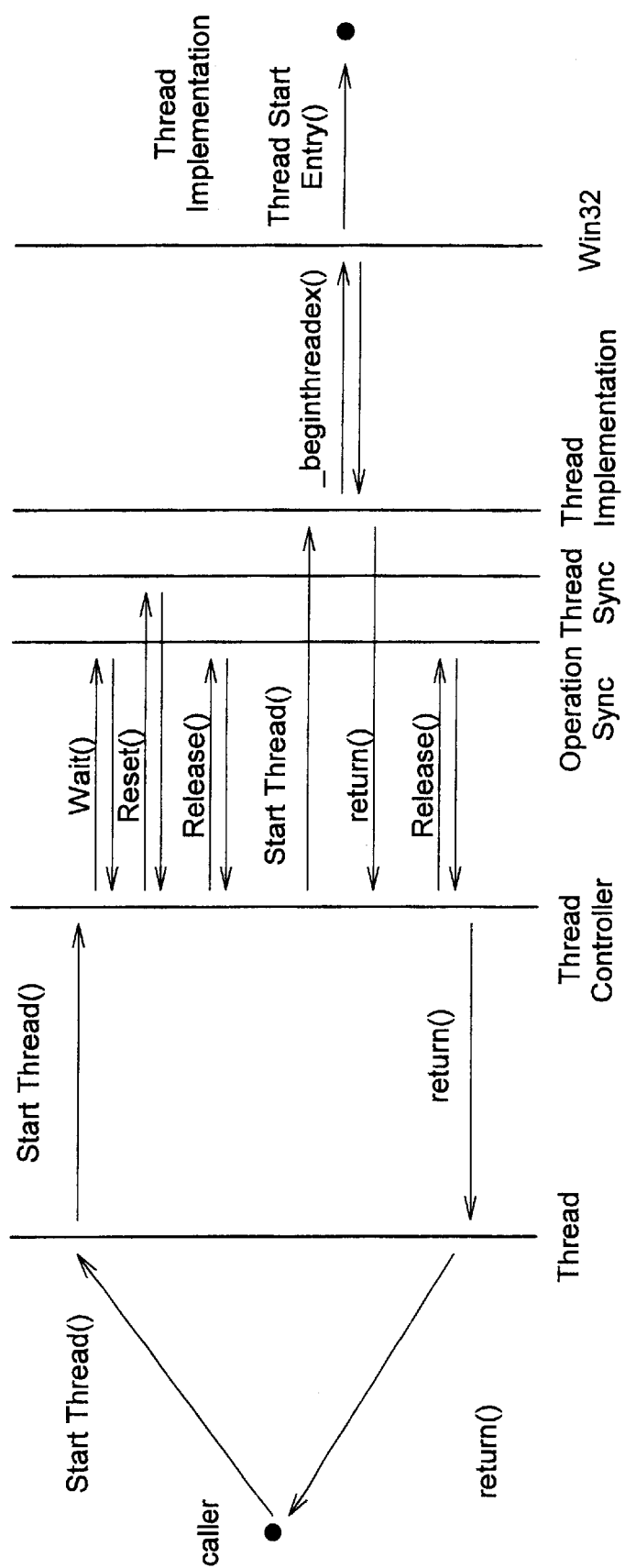
FIG. 5 is an object interaction diagram for the Start Thread method.

FIG. 5 is an object interaction diagram for the Start Thread method. Each of the vertical lines represents the control of the object instance identified at the bottom of the line. The directional lines represent methods that are initiated. Directional lines without associated descriptions represent control returns to the calling instance.

The flow begins at the left where a caller program initiates the Start Thread method of a Thread instance, which in turn initiates the Start Thread method of a Thread Controller instance. The Thread Controller first initiates a Wait method of an Operation Sync instance. The Wait method synchronizes with any operations occurring at the time the method is called.

The Thread Controller coordinates starting the thread with any other operations accessing the thread. The Operation Sync allows either a Thread Implementation instance or a user to access the Thread Controller instance. Thus, the Operation Sync only allows one of a user or a Thread Implementation instance to access a Thread Controller instance at a time. The Reset method is called to indicate that the thread is just beginning, and Release method is called to change the Thread State from IDLE to RUNNING and release the critical section.

The Thread Controller instance then calls the Start Thread method of a Thread Implementation instance, which makes an operating system (Win32, for example) call (_beginthreadex( )) to commence thread execution. The operating system then calls back to the Thread Start Entry method of the Thread Implementation instance. The interaction diagram for thread execution continues with FIG. 6.

Control returns from the operating system to the Thread Controller after the Thread Start Entry method has been initiated. Note that the thread execution of FIG. 6 and the return of control to the thread controller, and eventually the caller, occur concurrently.

The Thread Controller calls the Release method of Operation Sync. This results in further operations to be allowed against the thread, e.g. Wait For Completion, or Queue Alertable Operation. Control is subsequently returned to the original caller.

Figure 6:
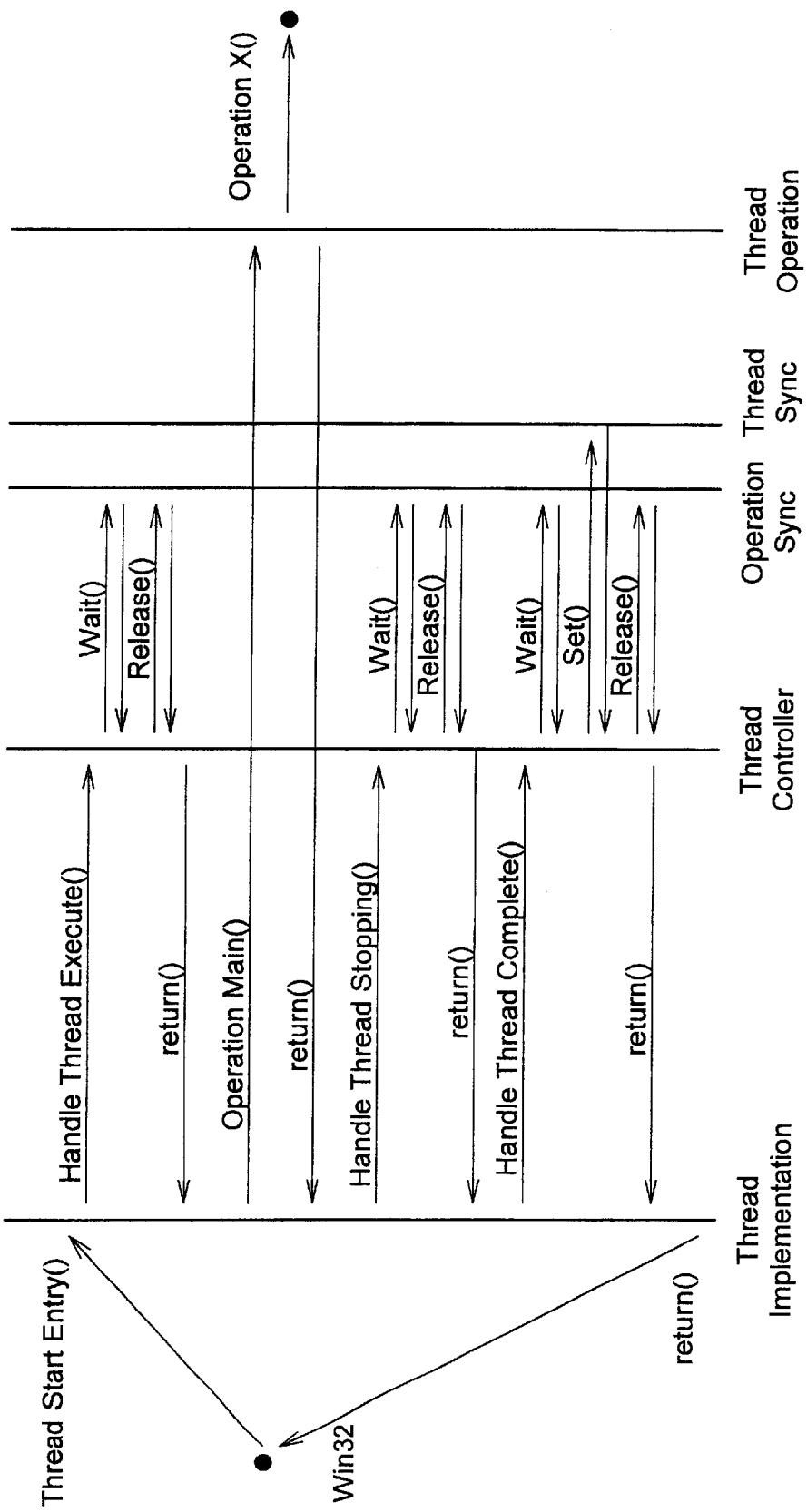
FIG. 6 is an object interaction diagram showing the execution of a thread.

FIG. 6 is an object interaction diagram showing the execution of a thread, as continued from FIG. 5. From the Thread Implementation Instance, the Handle Thread Execute method of a Thread Controller is called. The Handle Thread Execute method to indicate to the Thread Controller that the thread is beginning execution. The Thread Controller then executes the Wait method of the Operation Sync followed by the Release method, which changes the Thread State from IDLE to RUNNING and releases the critical section. Control is then returned to the Thread Implementation.

The Thread Implementation then calls the Operation Main method of the Thread Operation instance, and the Thread Operation calls the users application, which in the example is designated as Operation X.

When Operation X completes, control is returned to the Thread Implementation, which then calls the Handle Thread Stopping method of the Thread Controller. In response, the Thread Controller calls the Wait method to synchronize with other requests referencing the thread. The Release method sets the Thread State to STOPPING. Control is then returned to the Thread Implementation.

At this point in the control flow, if there are any queued alertable operations as indicated by the Alertable Operation Count, the Thread Implementation can go into a sleeping state to drain the remaining queued alertable operations. The operating system will then schedule any alertable operations with the thread. The operating system then checks alertable queue 310 for queued operations. If there are additional queued operations, the Thread Start Entry method is called for the next operation.

Once all the queued alertable operations have been completed, the Thread Implementation calls the Handle Thread Complete method of the Thread Controller. The Wait method is called to synchronize with any other requests referencing the thread. Then the Set method is called to set the Thread Sync to indicate that the thread is complete. The Release method is called to release the protection of the Queue Alertable Operation. Control is then returned to the Thread Implementation and then to the operating system.

Figure 7:
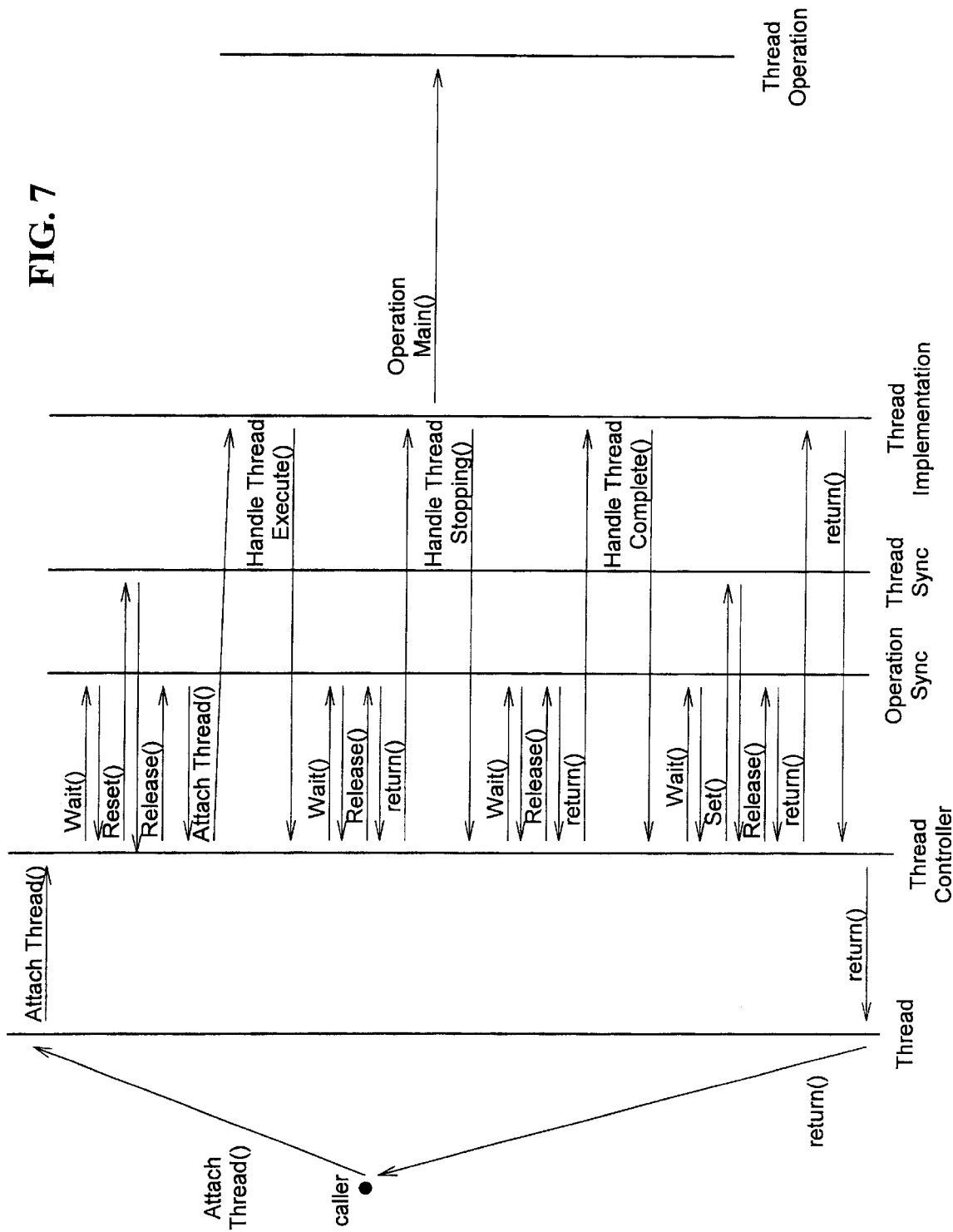
FIG. 7 is an object interaction diagram that illustrates the process of attaching a thread to a Thread Operation.

FIG. 7 is an object interaction diagram that illustrates the process of attaching a thread to a Thread Operation. To attach a Thread Operation to a thread, the caller calls the Attach Thread method of a Thread instance. The Thread in turn calls the Attach Thread method of the Thread Controller. As described above for the diagram of FIG. 5, the Thread Controller performs a Wait, Reset, and Release sequence prior to calling the Attach Thread method of the Thread Implementation.

The Attach Thread method of the Thread Implementation is called, and the Handle Thread Execute method of the Thread Controller is called from the Thread Implementation. From this point to the end of the interaction diagram, the processing is the same as that described in the thread executing object interaction diagram of FIG. 6. That is, the Thread Implementation calls the Handle Thread Execute method of the Thread Controller, followed by Wait and Release methods called by the Thread Controller, and then calling the Operation Main method of the Thread Operation. It will be appreciated that the Thread Operation then calls the Operation X even though it is not shown. The clean-up activities (Handle Thread Stopping and Handle Thread Complete) and return of control to the caller are as described in FIG. 6.

Figure 8:
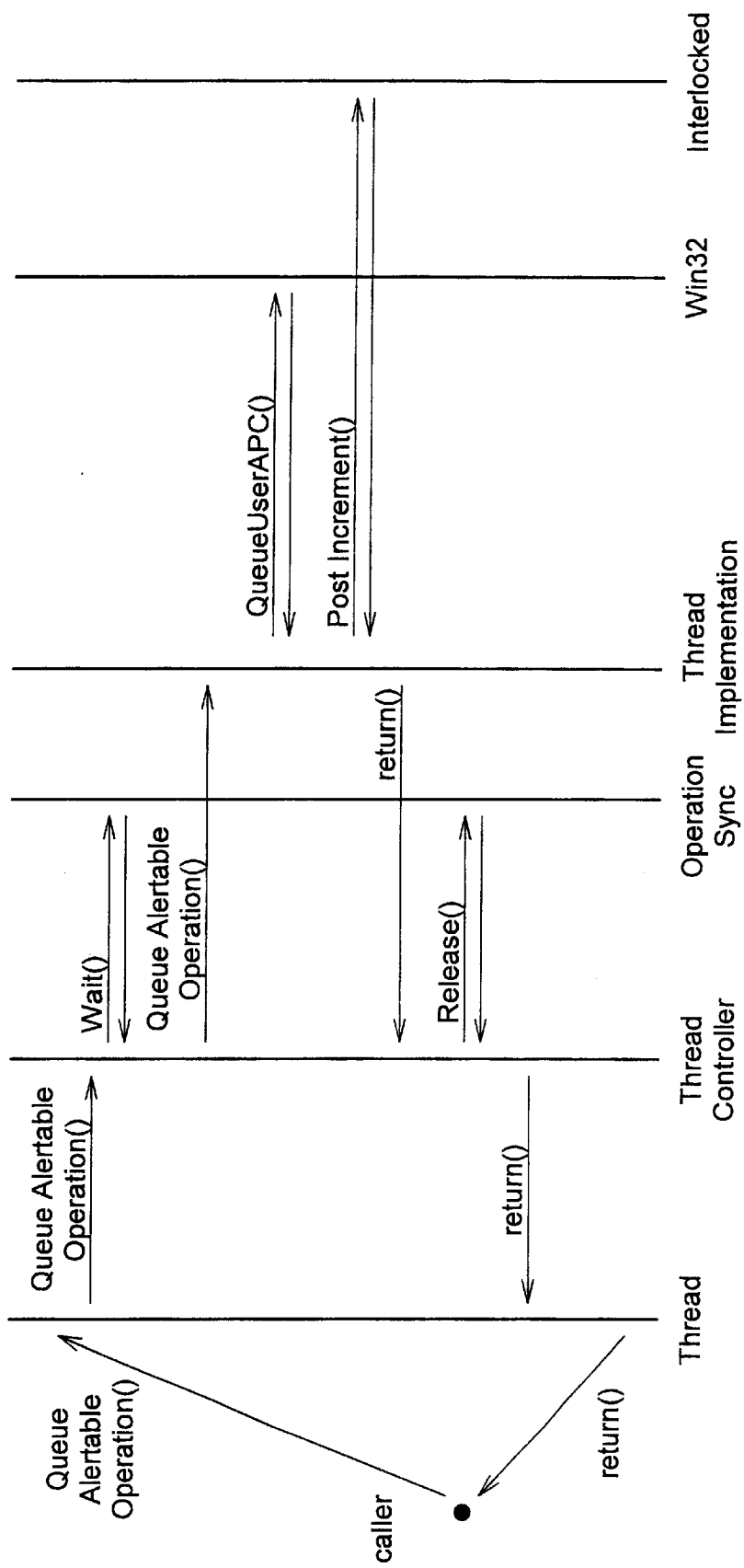
FIG. 8 is an object interaction diagram illustrating queuing an alertable operation with the operating system.

FIG. 8 is an object interaction diagram illustrating queuing an alertable operation with the operating system in accordance with the invention. A caller application calls the Queue Alertable Operation method of a Thread, which in turn calls the Queue Alertable Operation of a Thread Controller. The Thread Controller calls the Wait method to synchronize with any other operations calling the Thread Controller, and then calls the Queue Alertable Operation of a Thread Implementation. It is important to synchronize at this stage so that an alertable operation is not queued to a thread whose state is STOPPING. Thus, if the request would be rejected if the thread was in the STOPPING state. The Thread Implementation calls the operating system method to queue the alertable operation, for example, the QueueUser-APC method in Windows NT.

After the operation is queued, the Thread Implementation increments the Alertable Operation Count with the Post Increment method and then returns control to the Thread Controller. The Thread Controller then releases the operation synchronization with the Release method and then returns control to the Thread, which returns control to the caller.

Figure 9:
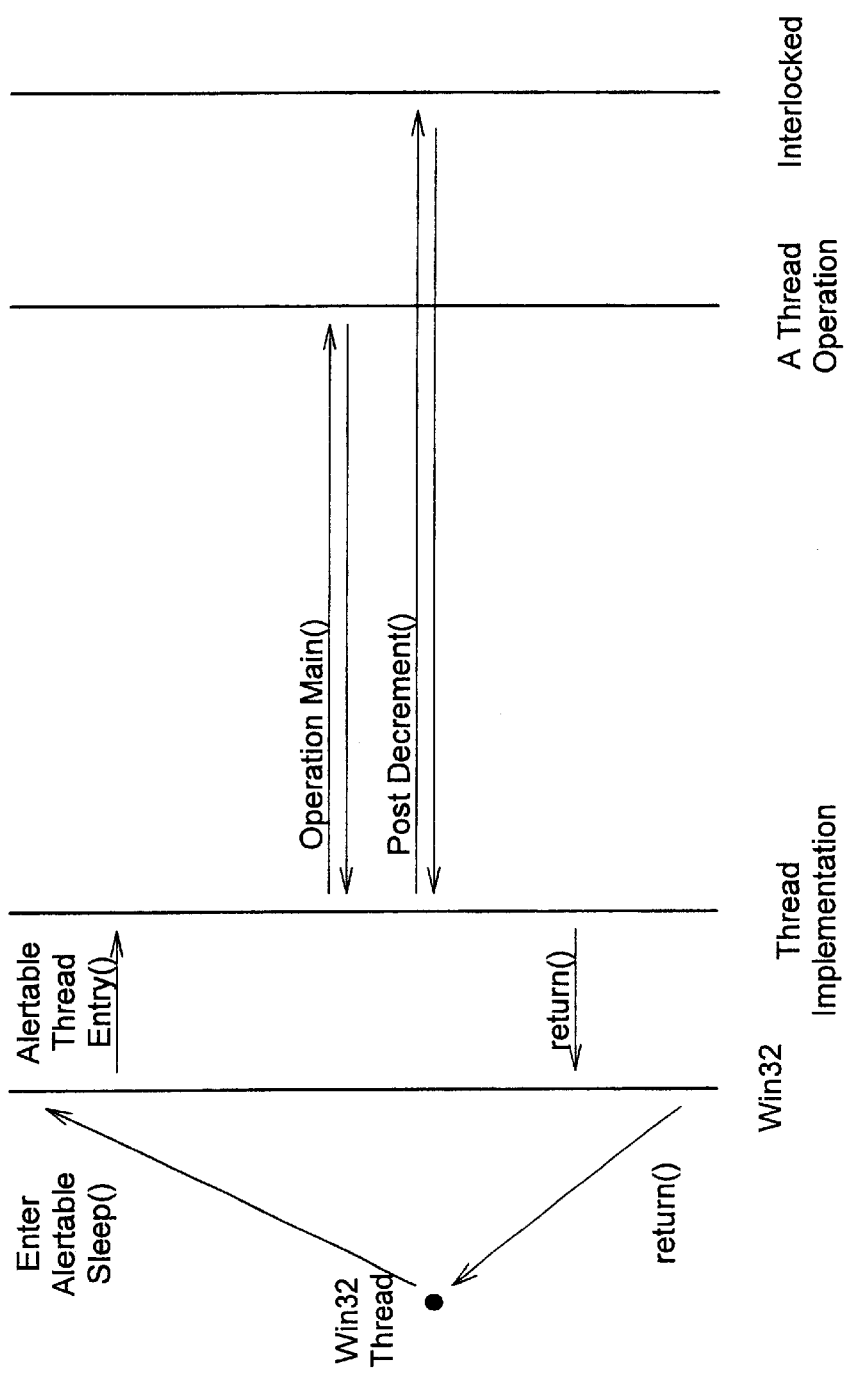
FIG. 9 is an object interaction diagram illustrating the processing that occurs when the operating system executes an alertable operation with a Thread Implementation.

FIG. 9 is an object interaction diagram illustrating the processing that occurs when the operating system executes an alertable operation with a Thread Implementation. When the Win32 Thread object enters an Alertable Sleep (through any number of Win32 APIs), Win32 dispatches the Win32 Thread to the Alertable Thread Entry method in the Thread Implementation. The Thread Implementation then calls the Operation Main method of the Thread Operation as described above.

After the operation completes, the Post Decrement method is called to decrement the Alertable Operation Count. Control is then returned to the Thread Implementation and then to the operating system.

Accordingly, the present invention provides, among other aspects, a method for reusing threads for different programmed operations. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

We claim:

1. A computer-implemented method for data processing with multifunctional threads, comprising:
   defining a thread class;
   defining a thread operation class;
   defining a first application operation class as a subclass of the thread operation class, wherein the first application operation class includes a first set of one or more member attributes;
   defining a second application operation class as a subclass of the thread operation class, wherein the second application operation class includes a second set of one or more member attributes, and the first set of attributes are of types different from the second set of attributes;
   instantiating a second application operation;
   instantiating a thread in an idle state;
   instantiating a first application operation;
   executing the first application operation with the thread;
   returning the thread to the idle state after completion of the first application operation;
   executing the second application operation with the thread; and
   returning the thread to the idle state after completion of the second application operation.

2. The method of claim 1 wherein:
   the first application operation class includes a set of one or more member methods and the second application operation class includes a second set of one or more member methods; and
   the first set of methods is different from the second set of methods.

3. The method of claim 1, further comprising:
   queuing the second application operation with the thread after the first application operation; and wherein executing the second application operation with the thread is performed after executing the first application operation.

4. A computer-implemented method for data processing with multifunctional threads, comprising:
   defining a thread class;
   defining a thread operation class;
   defining a first application operation class as a subclass of the thread operation class, the first application operation class having a first set of member attributes and methods;
   defining a second application operation class as a subclass of the thread operation class, the second application operation class having a second set of member attributes and methods different from the first set;
   instantiating a thread in an idle state;
   instantiating a first application operation;
   instantiating a second application operation;
   queueing the first application operation with an operating system for execution with the thread;
   queuing the second application operation with the operating system for execution with the thread; and
   executing the first and second application operations as scheduled by the operating system.

5. An apparatus for reusing a thread for different programmed operations, comprising:
   means for defining a thread class;
   means for defining a thread operation class;
   means for defining a first application operation class as a subclass of the thread operation class, the first application operation class having a first set of member attributes and methods;
   means for defining a second application operation class as a subclass of the thread operation class, the second application operation class having a second set of member attributes and methods different from the first set;
   means for instantiating a thread in an idle state;
   means for instantiating a first application operation;
   means for instantiating a second application operation;
   means for queuing the first application operation with the operating system for execution with the thread;
   means for queuing the second application operation with the operating system for execution with the thread; and
   means for executing the first and second application operations as scheduled by the operating system.

6. A computer-implemented method for data processing, comprising:
   defining a thread operation class;
   defining first and second application operation classes as subclasses of the thread operation class, wherein each of the first and second application operation classes includes a respective set of member attributes, and the set of member attributes of the first application operation class is different from the set of member attributes of the second application operation class;
   instantiating a first application operation as an object of the first application operation class;
   instantiating a thread;
   queuing the first application operation object for execution with the thread;
   instantiating a second application operation as an object of the second application operation class;

queuing the second application operation object for execution with the thread; and executing the first and second application operations using the thread.

7. The method of claim 6, further comprising:

setting respective priority levels for each of the first and second application operation objects;

scheduling the first and second application operations for execution based on the priority levels.

8. The method of claim 7, wherein the first and second application operation classes include respective sets of one or more member methods, and the set of methods of the first application operation class is different from the set of methods of the second application operation class.

9. The method of claim 8, wherein the queuing of the first and second application operation objects includes queuing the respective objects with an operating system that manages the thread, and the method further comprises scheduling execution of the application operation objects by the operating system.

10. The method of claim 6, wherein the first and second application operation classes include respective sets of one or more member methods, and the set of methods of the first application operation class is different from the set of methods of the second application operation class.

11. The method of claim 6, wherein the queuing of the first and second application Operation objects includes queuing the respective objects with an operating system that manages the thread, and the method further comprises scheduling execution of the application operation objects by the operating system.

12. An apparatus for data processing, comprising:

means for establishing a definition of a thread operation class;

means for establishing definitions of first and second application operation classes as subclasses of the thread operation class, wherein each of the first and second application operation classes includes a respective set of member attributes, and the set of member attributes of the first application operation class is different from the set of member attributes of the second application operation class;

means for creating an instance of a first application operation as an object of the first application operation class;

means for creating an instance of a second application operation as an object of the second application operation class;

means for creating an instance of a thread;

means for putting the first application operation object and the second application operation object in a queue for execution with the thread; and means for scheduling execution of the first and second application operations using the thread.

* * * * *

UNITED STATES PATENT AND TRADEMARK OFFICE
CERTIFICATE OF CORRECTION

PATENT NO.     : 6,832,376 B1
DATED          : December 14, 2004
INVENTOR(S)    : James A. Sievert and Mark K. Vallevand It is certified that error appears in the above-identified patent and that said Letters Patent is hereby corrected as shown below:

Column 10,
Line 21, the term "the" should be replaced by the term -- an --.

Signed and Sealed this

Twenty-second Day of March, 2005

JON W. DUDAS
*Director of the United States Patent and Trademark Office*